US007010331B2

(12) United States Patent
Johnson et al.

(10) Patent No.: US 7,010,331 B2
(45) Date of Patent: Mar. 7, 2006

(54) WIRELESS COMMUNICATION DEVICE WITH LATCH

(75) Inventors: Gregg A. Johnson, Carlsbad, CA (US); Richard E. La Spesa, Santee, CA (US); Mark Edward Simek, San Diego, CA (US); John J. Wendorff, San Diego, CA (US); Gad Shaanan, La Jolla, CA (US)

(73) Assignee: Kyocera Wireless Corp., San Diego, CA (US)

( * ) Notice: Subject to any disclaimer, the term of this patent is extended or adjusted under 35 U.S.C. 154(b) by 353 days.

(21) Appl. No.: 10/152,186

(22) Filed: May 20, 2002

(65) Prior Publication Data

US 2004/0203501 A1    Oct. 14, 2004

(51) Int. Cl.
*H04B 1/38*     (2006.01)
(52) U.S. Cl. ............................... 455/575.1; 455/575.3; 455/575.6; 455/90.3; 379/446; 379/454; 379/455
(58) Field of Classification Search ............. 455/550.1, 455/575.1, 575.3, 575.6, 90.3; 379/446, 379/454, 455; 224/268, 269, 668, 669, 675
See application file for complete search history.

(56) References Cited

U.S. PATENT DOCUMENTS

| | | | |
|---|---|---|---|
| D376,145 S * | 12/1996 | Hathorn et al. ............ D14/147 |
| 6,223,402 B1 * | 5/2001 | Lacy ........................ 24/599.4 |
| 6,625,469 B1 * | 9/2003 | Hwang et al. ........... 455/550.1 |
| 6,742,685 B1 * | 6/2004 | Williams ..................... 224/197 |
| 6,754,514 B1 * | 6/2004 | Nakamura ............... 455/575.3 |
| 2002/0183017 A1 * | 12/2002 | Mujica ........................ 455/90 |

* cited by examiner

*Primary Examiner*—Sonny Trinh
*Assistant Examiner*—Un C. Cho

(57) ABSTRACT

According to a preferred embodiment of the present invention, there is provided a mobile telephone handset construction, which is adapted to be attached removably in an inverted manner to a support element, such as a strap, loop or ring attached to a back-pack or other article of wearing apparel, or any other suitable support element used for supporting the handset construction. The construction of an embodiment of the invention can be quickly retrieved and responded to in a convenient manner when a call is being received. The construction includes a display mounted at a top front face portion of a housing to present information to the user when the display is viewed in a position adapted to be read by the user. A carabiner latch is connected to the housing for attaching to the support element to suspend the construction therefrom in an inverted manner for storage purposes. The latch is secured to a bottom portion of the housing at a substantial distance from the display to enable the handset construction to be suspended in an inverted substantially vertical position from the support element and able to be moved pivotally from the inverted position by the hand of the user in a quick and convenient manner to a position where the user is permitted to read the information contained on the display. All of this can be accomplished while the construction remains attached to the support element.

20 Claims, 6 Drawing Sheets

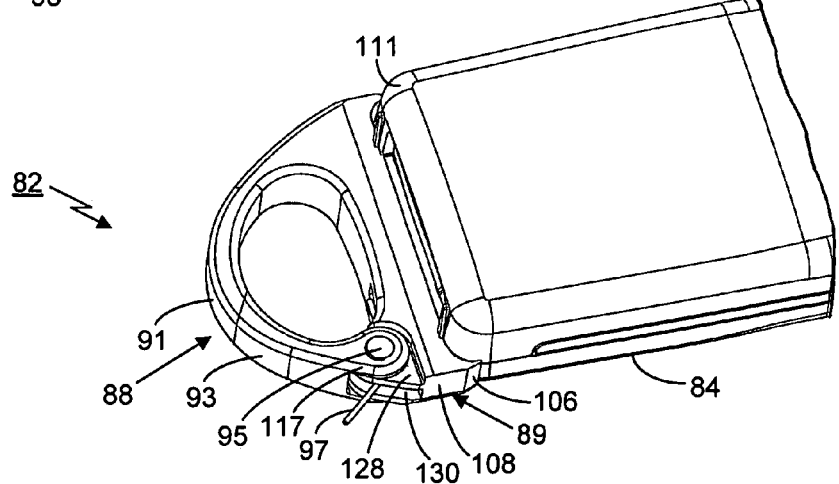

WIRELESS COMMUNICATION DEVICE WITH LATCH

FIELD OF THE INVENTION

The present invention relates in general to a mobile telephone handset construction and a method of using it. It more particularly relates to such a new and improved mobile telephone handset construction which employs a novel technique for supporting the construction when not in use.

BACKGROUND ART

Mobile telephones have become popular to use in recent times. Such telephones typically employ wireless communication technology, and the telephone handset is small and compact in size to be conveniently portable.

While such handset constructions are small and lightweight, they are sometimes difficult or somewhat bulky to transport in the sense that they are typically taken with the user and stored in a pocket or purse of the user. In this regard, should the mobile telephone be stored in the pocket or purse of the user, it is sometimes awkward for the user to retrieve the telephone when a call is being received. It is desirable, of course, for the user to retrieve quickly the mobile telephone so that the user can respond to the call promptly.

There have been employed holsters or clips, which are adapted to attach telephones to the belt or wearing apparel of the user. In this manner, the user's telephone handset would not occupy space in the user's pocket or purse. However, using holsters, clips or other such handset supporting devices, while satisfactory for some applications, may not be entirely convenient to use for some applications, especially when the user is receiving a call. When receiving a call, it is desirable for the user to quickly free the telephone from the holster or clip to use the telephone instrument to answer the call. However, it is somewhat awkward and time-consuming to retrieve the handset for certain applications. Thus, the user can fumble around under the pressure of the telephone sending an attention-attracting ringing signal, while the user is attempting to free the telephone instrument from the holster or clip and respond to the call. This can be upsetting to the user, especially when the call is unwanted or unintended for the user.

DESCRIPTION OF THE DRAWINGS

The following is a description of the drawings:

FIG. 7 is a fragmentary pictorial view illustrating a bottom face portion of yet another mobile telephone construction, which is constructed in accordance with a further embodiment of the present invention;

FIGS. 8 and 9 are fragmentary pictorial views of the construction of FIG. 7, illustrating other perspectives thereof;

DETAILED DESCRIPTION OF PREFERRED EMBODIMENTS

Figure 1:
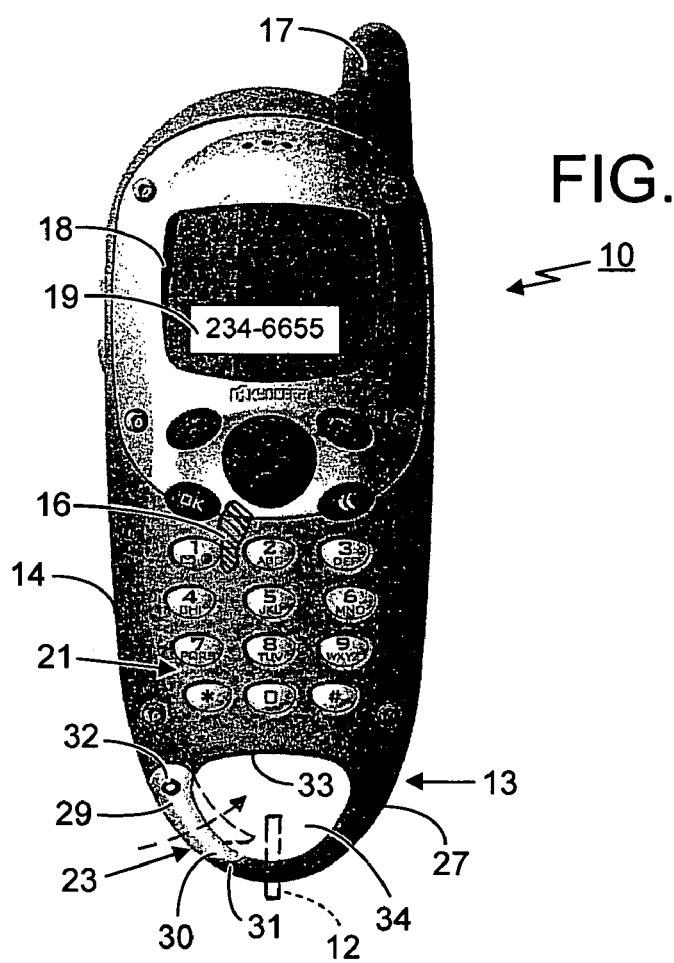
FIG. 1 is a face view of a mobile telephone handset, which is constructed in accordance with one of the embodiments of the present invention, and which has a portion thereof broken away to show the internal components thereof.

According to a preferred embodiment of the present invention, there is provided a mobile telephone handset construction, which is adapted to be attached removably in an inverted manner to a support element, such as a strap, loop or ring attached to a back-pack or other article of wearing apparel, or any other suitable support element used for supporting the handset construction. For example, the construction could be attached to a stationary support element, such as a hook fastened to a wall or desk.

The construction, therefore, can be carried conveniently by the user, or stored by suspending it from a stationary support surface, as well.

The construction of an embodiment of the invention can be quickly retrieved and responded to in a convenient manner when a call is being received. The construction includes a display mounted at a top front face portion of a housing to present information to the user when the display is viewed in a position adapted to be read by the user.

A carabiner latch is connected to the housing for attaching to the support element to suspend the construction therefrom in an inverted manner for storage purposes. The latch is secured to a bottom portion of the housing at a substantial distance from the display to enable the handset construction to be suspended in an inverted substantially vertical position from the support element and able to be moved pivotally from the inverted position by the hand of the user in a quick and convenient manner to a position where the user is permitted to read the information contained on the display. All of this can be accomplished while the construction remains attached to the support element.

In use, when a call is received by the telephone construction, the user can readily swing the handset construction from its inverted position about the carabiner latch to a horizontal position or other angular position where the display information can be read by the user without having to free the construction from the support element. In this manner, the user can quickly gain access to the telephone handset construction and thus be able to respond to the call. For example, if the user has a caller identification service, the user can determine who the caller is by reading the display information. Also, for example, the user can turn off the telephone construction by deactivating it. If the user desires to answer the call, the handset construction can be released quickly from the support element and then used in the conventional manner.

In one of the embodiments of the present invention, the carabiner latch is removably attachable to the construction so that existing telephone constructions can be fitted with the carabiner latch for convenient storage purposes. In another embodiment of the present invention, the carabiner latch can be moved to various different positions by the user. One position is the deployed position, another position is a folded away or storage position, and yet another position is a standing position which enables the construction to stand substantially upright on a horizontal support surface.

Figure 2:
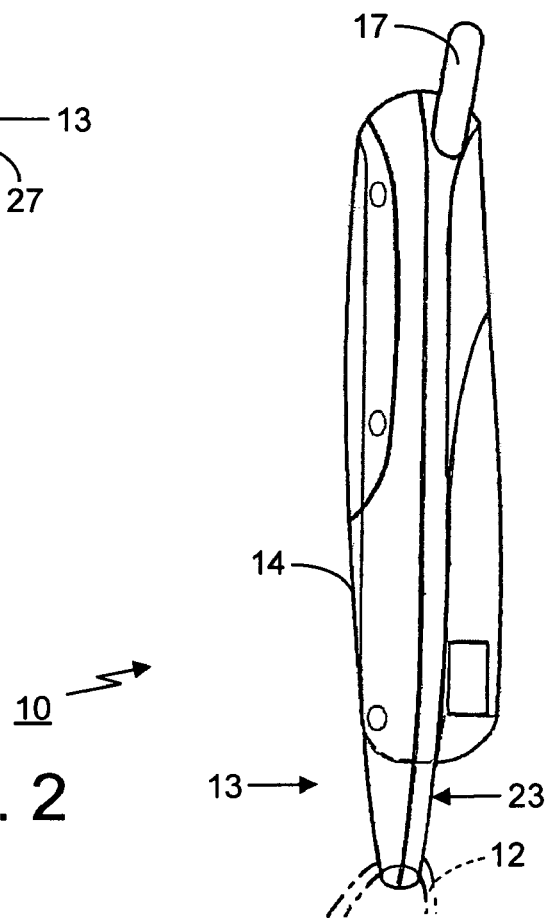
FIG. 2 is an side elevational view of the construction of FIG. 1.
Figure 3:
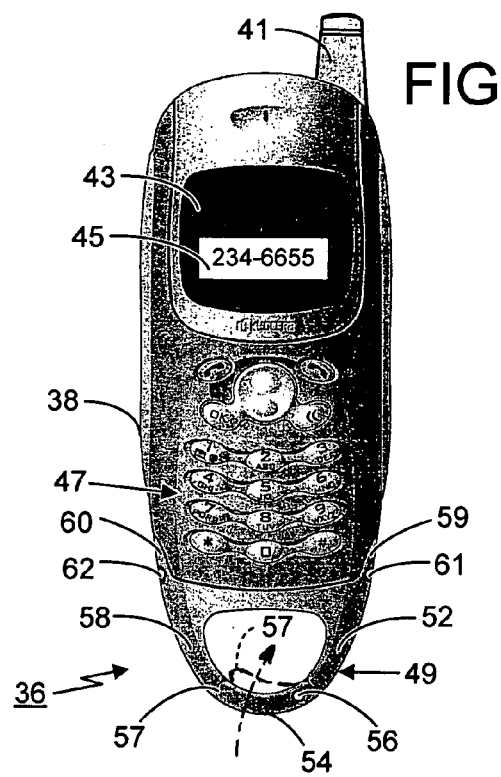
FIG. 3 is a face view of another mobile telephone construction, which is constructed in accordance with another embodiment of the present invention.

Referring now to FIGS. 1 and 2 of the drawings, there is shown a mobile telephone handset construction 10, which is constructed in accordance with an embodiment of the present invention.

The construction 10 is adapted to be supported from a support element 12, which may be a strap, loop, ring or other device attached to a back-pack or other article of wearing apparel, or any other suitable support element not necessarily intended to be worn by the user. Another example of a support element would be a hook fixed to a vertical support surface for hanging in an inverted manner the construction 10 when not in use. For sake of viewing the construction 10 more clearly, the construction 10 is illustrated in an inverted position in FIGS. 1 and 2, whereby the construction 10 is supported from its bottom end portion 13 in a downwardly depending manner from the support element 12.

The construction 10 generally comprises an elongated housing 14 confining an electronic telephone circuit 16 to enable the construction 10 to perform as a mobile telephone such as a cellular or wireless telephone. As will become apparent to those skilled in the art, the construction according to another embodiment of the invention may be used as a hand-held device such as a pager, calculator, clock or other device.

A display is mounted on the front face of the housing 14 for displaying information 19 in response to the electronic telephone circuit 16. A keypad generally indicated at 21 is disposed on the front face of the housing 14 below the display 18 for entering information in the electronic telephone circuit 16.

A carabiner latch 23 is disposed at the bottom end portion 13 of the housing 14 spaced a substantial distance from the display 18 to enable the construction 10 to be attached to the support element 12. The latch 23 includes an integral hook portion 27 which cooperates with a spring biased latch member 29 pivotally attached at 32.

The latch member 29 has a beveled tip portion 30 engaging a complementary shaped beveled tip portion 31 of the hook member 27 to form a closed loop configuration for linking with the support element 12. In this regard, the latch member 29 is spring biased into its closed position as indicated in solid lines. In order to open the latch 23, the user pushes the latch member 29 inwardly to cause it to pivot about the pivot point 32 as indicated in broken lines.

When the latch 23 is closed, the latch member 29 and the J-shaped hook member 27 cooperate to assume a smoothly-rounded generally semi-circular U-shaped configuration and forms with a housing portion 33 (FIG. 1) a D-shaped closed loop or opening 34 for capturing the support element 12. This general configuration of the opening 34 together with the shape of the latch member 29 and the hook member 27 enables the user to manipulate the construction 10 relative to the support element 12, while maintaining the latch 23 in its closed position attached to the support element 12.

In use, the user can pivot the latch member 29 inwardly as indicated in broken lines to allow the hook portion 27 to engage the supporting element 12, and then the spring biased latch member 29 snaps back until its tip portion engages the tip portion of the hook for capturing the support element in place. A reverse operation enables the user to disengage the latch 23 from the support element 23.

Referring now to FIGS. 3, 4, 5, and 6 of the drawings, there is shown a mobile telephone construction 36, which is also constructed in accordance with another embodiment of the present invention. The construction 36 is generally similar to the construction 10, except that the latch portion performs additional functions.

The construction 36 includes an elongated housing 38, which includes an antenna 41, and a display on the front face of the housing 38 near the upper portion thereof near the antenna 41. Information 45, such as a telephone number, can be displayed on the display 43 and read by the user when the construction 36 is held at a position where the display information can be read by the user. A keypad 47 is also mounted on the front face of the construction 38.

A carabiner latch 49 is connected to the bottom end portion of the housing 38 in a manner similar to the construction 10, except that the carabiner latch 49 is pivotally attached to the housing 38 as hereinafter described in greater detail. The latch 49 includes a hook portion 52 and a spring-biased latch member 54 pivotally attached at 56 to the hook portion 52 for engaging a rounded tip end portion 57 of a right integral hook portion 58 to provide a closed loop or ring in its normally-closed position of the latch member 54 in a similar manner as the latch 23 of the construction 10 of FIG. 1.

Figure 4:
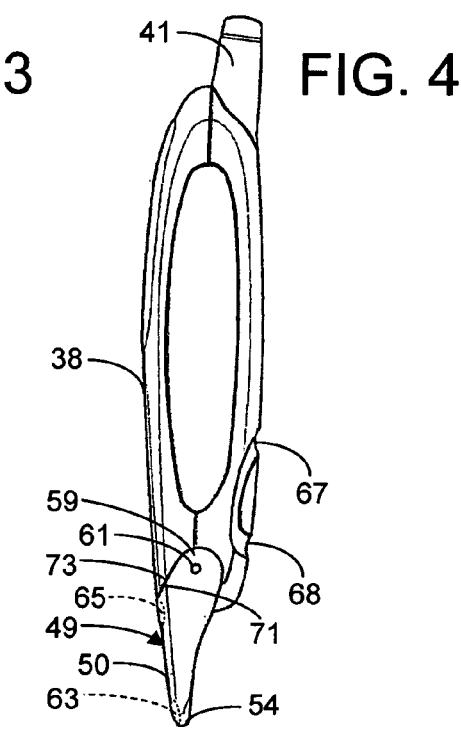
FIGS. 4–6 are side elevational views of the construction of FIG. 3, illustrating it in various modes of operation.
Figure 6:
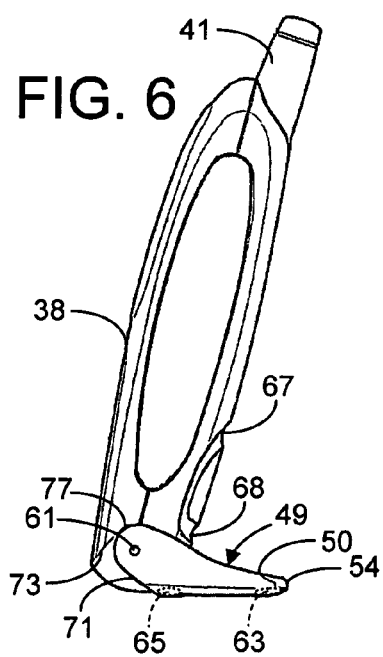
Figure 5:
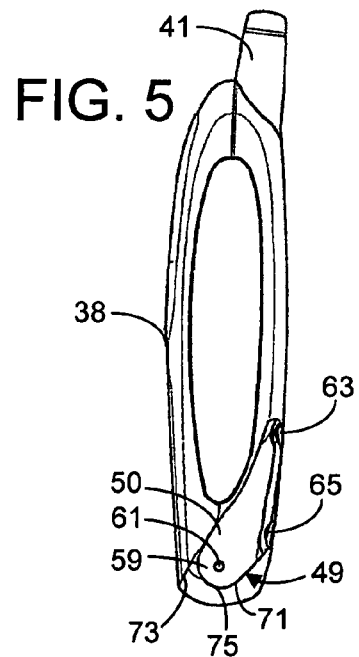

In order to pivotally connect the carabiner latch 49 to the housing 38, a pair of spaced-apart ears 59 and 60 are pivotally attached at 61 and 62 to the bottom end portion of the elongated housing 38. In so doing, the latch 49 pivots between an axially-extending deployed position as shown in FIG. 4, and a closed or storage position as shown in FIG. 5. As shown in FIG. 6, the latch 49 can assume a standing position substantially at right angles to the housing 38 to enable the construction 36 to rest on a horizontal support surface (not shown) in a generally upright position.

As shown in FIG. 5, a pair of internal integral detents or projections 63 and 65 on the inner surface of the latch 49 are adapted to snap into engagement with a pair of notches or grooves 67 and 68 on the rear face of the housing 38.

A flat 71 on the latch body 50 near the pivot points 61 and 62 engage a complimentary shaped shoulder or stop 73 of the construction housing 38 for receiving the flat 71 on the latch 49 when the latch 49 is disposed in its deployed position of FIG. 4 in alignment with the elongated housing 38.

As indicated in FIG. 5, a pair of curved or rounded surfaces such as a surface 75 engage a complimentary shaped stop surface 77 (FIG. 6) to maintain the latch member 49 in its position at substantially right angles to the elongated housing 38 to support it in a generally upright position.

Referring now to FIGS. 7, 8, 9, 10, 11 and 12 of the drawings, there is shown a further mobile telephone construction 82, which is also constructed in accordance with another embodiment of the present invention. The construction 82 is generally similar to the constructions 10 and 36, except that the construction 82 has a removable latch to serve as a replaceable accessory for the overall construction 82. The construction 82 generally comprises an elongated housing 84 having a keypad generally indicated at 86. A display (not shown) similar to the display 18 of FIG. 1 and an antenna (not shown) similar to the to the antenna 17 of FIG. 1 are mounted at the upper portion of the elongated housing 84. A removable carabiner latch 88 is detachably mounted at the bottom end of the elongated housing 84.

The latch 88 includes a latch body 89 having a depending hook portion 91 which cooperates with a spring-biased latch member 93 pivoted at 95 by means of a pivot pin 99 in a similar manner as the latch 23 of the construction 10 of FIG. 1. A spring 97 is adapted to surround the pivot pin 99 to resiliently urge the latch member 93 into its closed position in a similar manner as the latch 23 of FIG. 1, to form a closed loop configuration for linking with a support element (not shown) in a similar manner as described in connection with the latch 23 of the construction 23.

Figure 10:
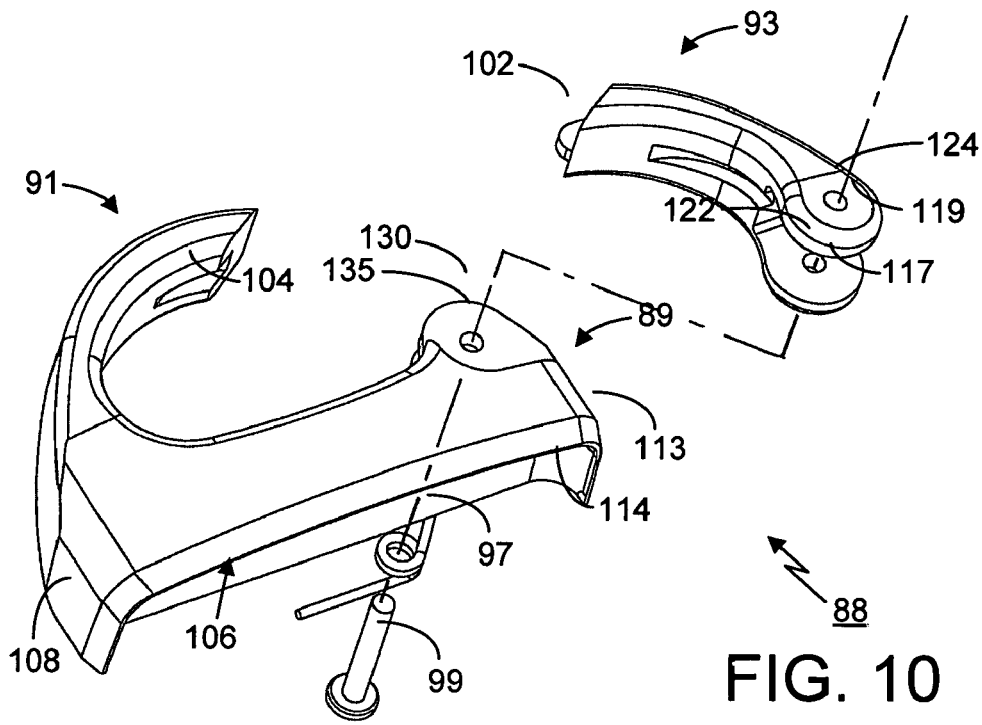
FIGS. 10–12 are exploded pictorial views of an attachment portion of the construction of FIG. 7, illustrating various perspectives thereof.
Figure 11:
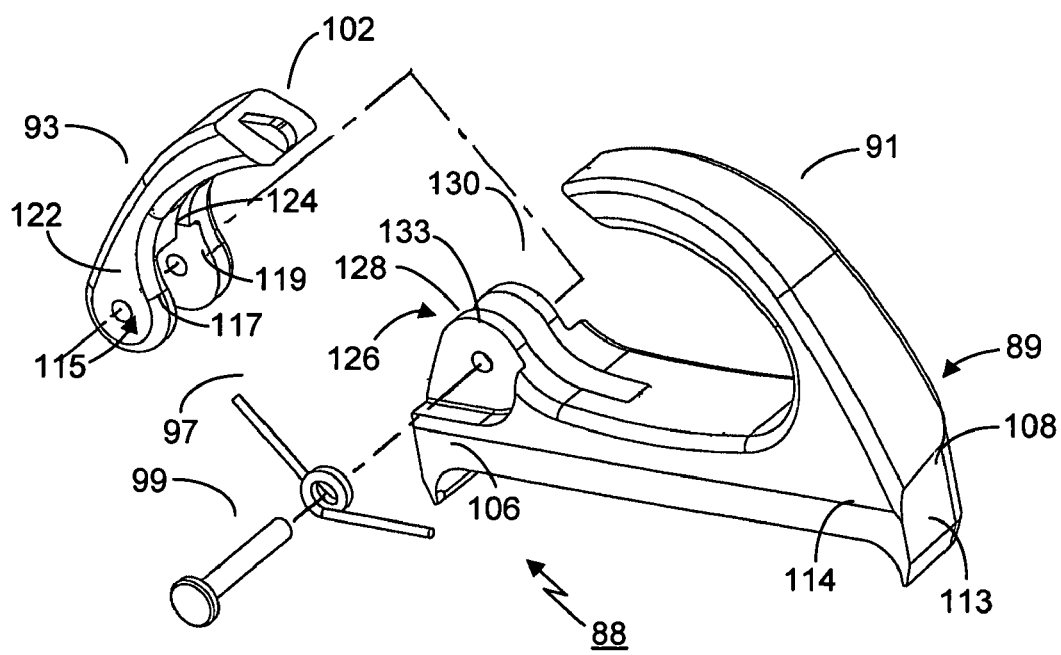
Figure 12:
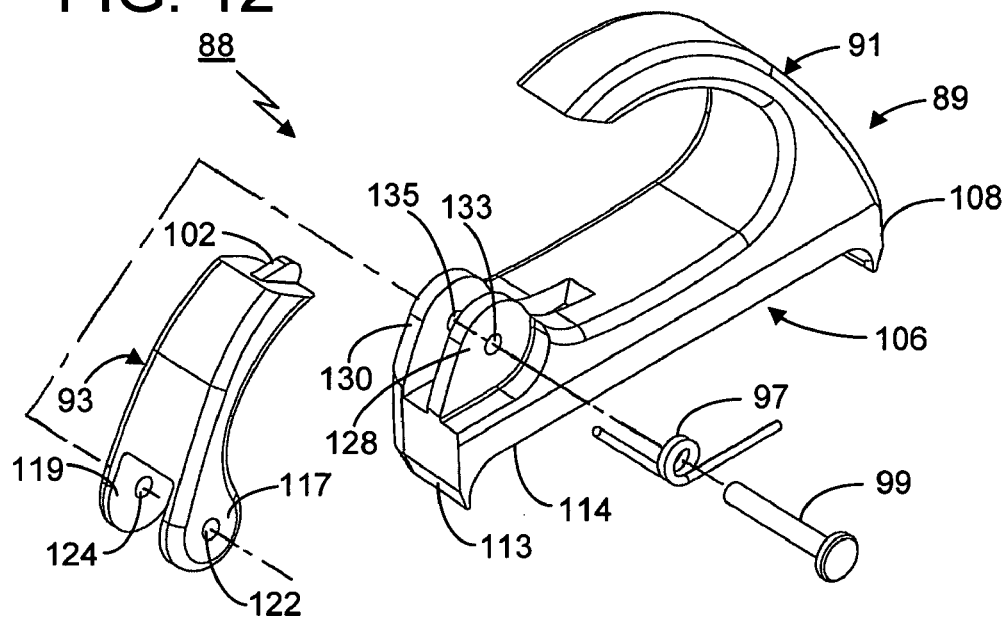

As best seen in FIGS. 10–12, a stop 102 at a beveled tip portion of the latch member 93 cooperates with a groove 104 in a complementary beveled tip portion of the hook portion 91, whereby the spring 97 biases the stop 102 into engagement with the groove 104 when the latch 88 is in its normally-closed position as shown in FIGS. 7–9.

An elongated cup-shaped socket 106 in a base portion 108 of the latch body 89 is adapted to snap into engagement with the bottom end portion 111 of the elongated housing 54 to secure the carabiner latch 88 in position to serve as a portion of the construction 82. As indicated in the drawings, the latch 88 is attached to the housing 84 in a friction-tight manner. It is to be understood that there may also be different types and kinds of fastening devices such as set screws (not shown), detents (not shown), or the like, which may also be employed either alternatively or in combination with the friction-tight fit.

Figure 13:
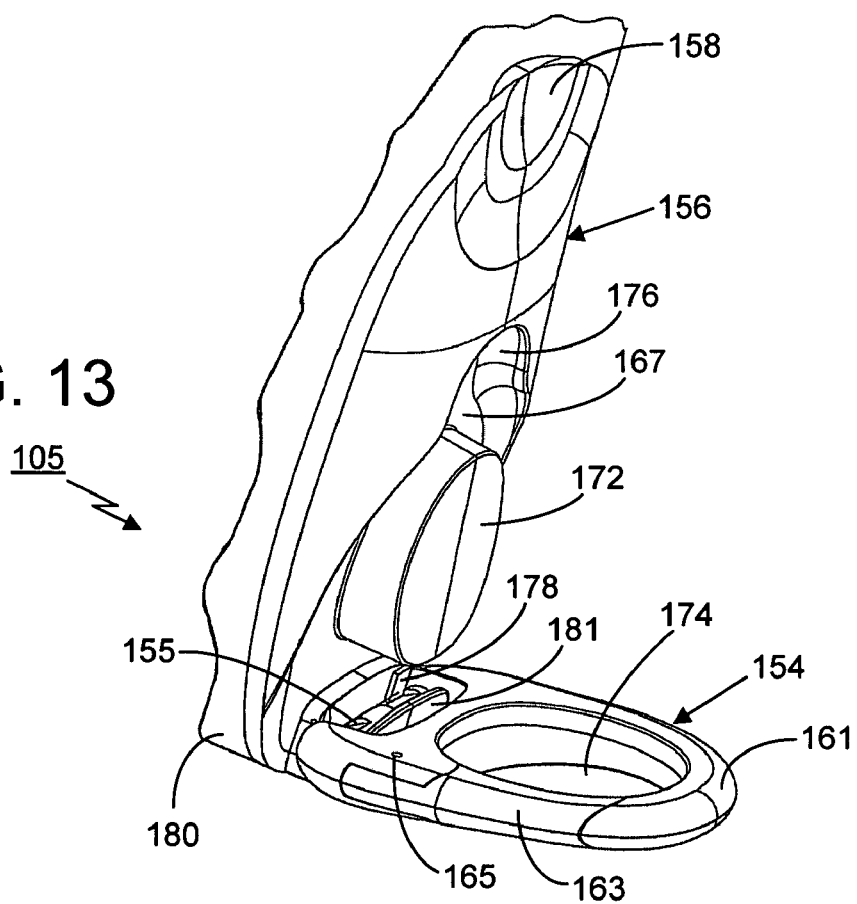
FIG. 13 is a fragmentary pictorial view illustrating a bottom face portion of a further mobile construction, which is constructed in accordance with a further embodiment of the present invention.
Figure 14:
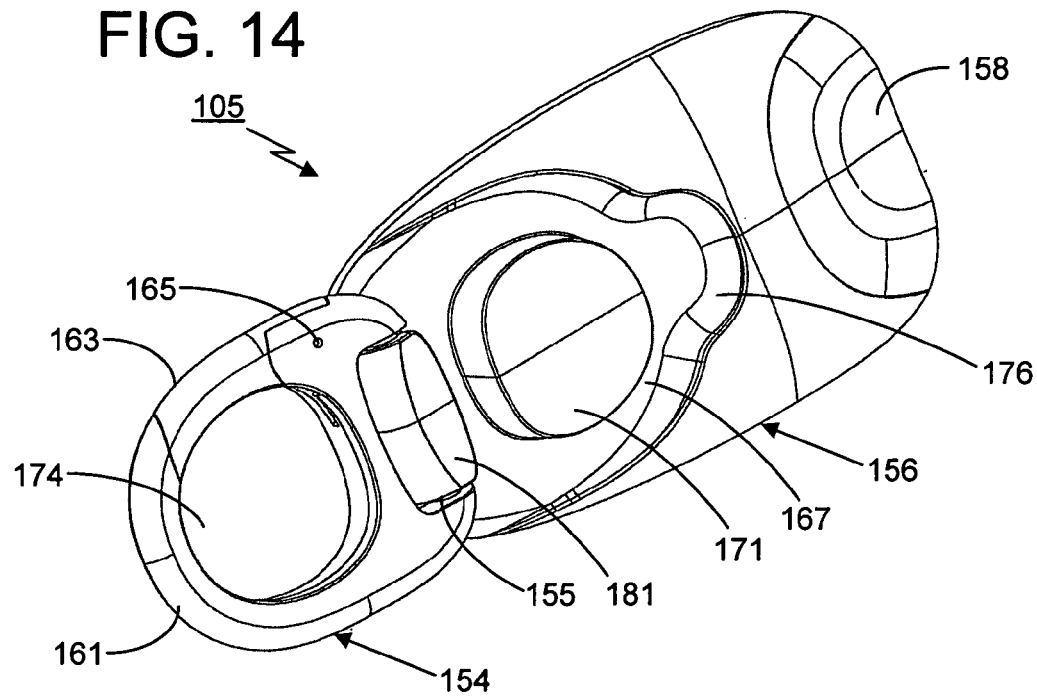
FIGS. 14 and 15 are pictorial views of the construction of FIG. 13, illustrating it in various modes of operation and showing only its battery door for sake of clarity.
Figure 15:
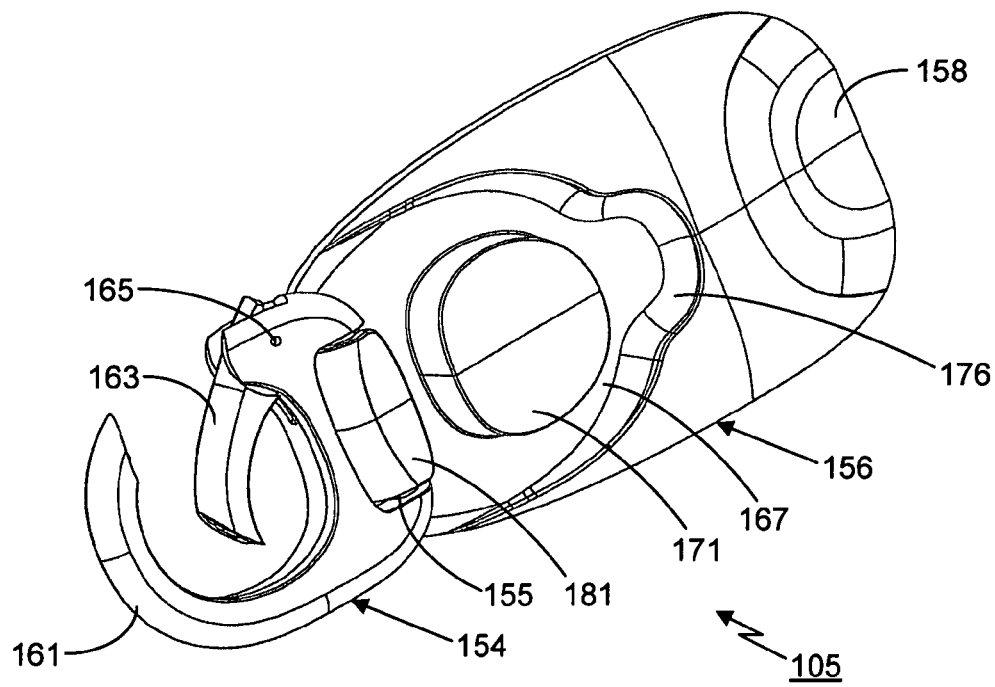

Referring now to FIGS. 13, 14 and 15 of the drawings, there is shown a mobile telephone construction 150, which is also constructed in accordance with another embodiment of the present invention. The construction 150 is generally similar to the construction 10, except that the latch portion is fitted to the housing of the construction in an alternate manner.

The construction 150 includes an elongated housing 180, which includes a carabiner latch 154 pivotally attached at 155 to a battery door 156 for a battery compartment (not shown) at the rear side of the housing 180. The battery door includes a door finger grip recess 158 to facilitate the opening of the door 156.

The carabiner latch 154 is generally similar to the latch 23 of the construction 10 and includes a hook portion 161 having a spring-biased latch 163 pivotally attached thereto at 165.

The latch 154 is adapted to be stored within a door open recess 167 for receiving the latch 163 for storage purposes. The latch can be swung outwardly away from the housing 180 to a variety of use positions as indicated in FIGS. 13, 14 and 15. As shown in FIG. 13, the latch 154 may be disposed at generally right angles to the housing 180 to support the construction 105 in a generally upright configuration when resting on a horizontal supporting surface similar to the mode of operation shown in FIG. 6. The latch 154 can be swung further outwardly into a position substantially within the plane of the door 156 to facilitate the use of the latch 154 for suspending the construction 105 in an inverted manner similar to the construction 10 of FIG. 1.

A cylindrical projection 172 is disposed within the door recess 167 for receiving frictionally a central opening 174 of the latch 154 in a friction type manner to facilitate retaining removably the latch 154 disposed substantially within the recess 167 for storage purposes. A finger grip recess 176 disposed within the door 156 facilitates the grasping of the latch 154 when it is disposed within the recess 167 to facilitate swinging it away from the housing 180 out of the recess 167 into the positions as indicated in FIGS. 13, 14 and 15.

In order to support the construction 105 in its upright position as indicated in FIG. 13, a detent spring finger or stop 178 is disposed at the pivotal connection 155 of the latch 154 to the housing 180 to engage the cylindrical projection 172 to limit its movement as indicated in FIG. 13 so that the latch 154 and the door 156 are generally disposed at right angles to one another. The stop 178 is spring loaded so that the stop can permit the latch 154 to pivot into the recess 167 from the right-angled disposition shown in FIG. 13. A shroud 181 is disposed adjacent to the stop 178 to conceal the stop 178 when the latch 154 is fully extended in its use position as indicated in FIGS. 14 and 15.

The elongated cup-shaped socket 106 includes a generally rectangularly shaped tapered rim 113 having an open back end 114 (FIG. 12).

Considering now the latch member 93 in greater detail, it has a bifurcated end portion 115 having a pair of legs 117 and 119. A pair of aligned holes 122 and 124 in the respective legs 117 and 119 are adapted to receive a bifurcated end portion 126 of the latch body 89. The bifurcated end portion 126 includes a pair of legs 128 and 130 having respective aligned holes 133 and 135 for receiving the pivot pin 99, which extends through the aligned holes 122, 124, 133 and 135 when the latch 88 is assembled. The spring 97 is adapted to surround the pin 99 and fit between the legs 128 and 130 when the unit is assembled as indicated in FIG. 9.

While particular embodiments of the present invention have been disclosed, it is to be understood that various different modifications and combinations are possible and are contemplated within the true spirit and scope of the appended claims. There is no intention, therefore, of limitations to the exact abstract or disclosure herein presented.

What is claimed is:

1. A mobile telephone handset comprising:
   an electronic circuit for wireless communications comprising:
      a display; a keypad; and an antenna;
   a battery unit for powering the electronic circuit, the display and the keypad; and
   a handset housing for containing the electronic circuit, the handset housing comprising:
      a front surface for holding the display proximate to a top surface of the handset housing and the keypad proximate to a bottom surface of the handset housing;
      a back surface for holding the battery;
      the top surface for holding the antenna;
      a first side surface having a first pivot point member proximate to the bottom surface;
      a second side surface having a second pivot point member proximate to the bottom surface;
      a carabiner latch pivotally attached to the housing at the first pivot point member and the second pivot point member; the carabiner latch extending beyond the bottom surface when in an extended position and forming a portion of the back surface when in a closed position.

2. The mobile telephone handset of claim 1, wherein the battery forms a portion of the back surface.

3. The mobile telephone handset of claim 2, wherein the carabiner latch forms at least a portion of the battery.

4. The mobile telephone handset of claim 3, wherein the carabiner latch is removably attached to the handset housing.

5. The mobile telephone handset of claim 1, wherein the carabiner latch pivots to an intermediate position, wherein the intermediate position enables the carabiner latch to be placed on a surface to hold the mobile telephone handset in an upright position on the surface.

6. The mobile telephone handset of claim 1, wherein the carabiner latch comprises a hook portion and a spring biased latch portion.

7. The mobile telephone handset of claim 1, wherein the spring biased latch portion comprises a projection, and the hook portion comprises a hook portion opening for receiving the projection.

8. The mobile telephone handset of claim 1, wherein the first pivot member and the second pivot member are removably attached to the handset housing.

9. The mobile telephone handset of claim 1, wherein the back surface of the handset housing has a recess area for receiving the carabiner latch in the closed position.

10. A mobile telephone handset for attachment to a support element, comprising:
   a housing comprising a top portion, a bottom portion, a front face, a back face, a first side surface and a second side surface;
   a display positioned on the front face of the housing adjacent to the top portion;
   a keypad positioned on the front face of the housing adjacent to the bottom portion;
   a battery unit positioned on the back face of the housing; and
   a carabiner-type latch connected to a first pivoting connector of the first side surface and a second pivoting connector of the second side surface, the carabiner-type latch extending below the bottom portion of the housing when the carabiner-type latch is pivoted into an extended position, and the carabiner-type latch forming part of the back face of the housing when the carabiner-type latch is in a closed position.

11. The mobile telephone handset of claim 10, wherein housing comprises a stop to enable the carabiner-type latch to be positioned at a substantially right angle to the housing for supporting the mobile telephone handset in an upright position on a surface.

12. The mobile telephone handset of claim 10 wherein the back face of the housing comprises a recess for receiving the carabiner-type latch for storage purposes when the carabiner-type latch is in the closed position.

13. The mobile telephone handset of claim 12, wherein the recess is integral to the battery unit.

14. The mobile telephone handset of claim 12, further comprising at least one detent extending from the carabiner-type latch for engaging at least one notch in a friction tight manner to secure the carabiner-type latch in the closed position within the recess.

15. The mobile telephone handset of claim 10, wherein the carabiner-type latch further comprises a hook member and an openable latch member, wherein the openable latch member is spring biased.

16. A wireless communication device comprising:
   a housing comprising a front surface, a back surface, a top surface, a bottom surface, a first side surface and a second side surface;
   a display positioned on the front surface of the housing and adjacent to the top surface;
   a keypad positioned on the front surface of the housing and adjacent to the bottom surface;
   a carabiner-type latch attached to the housing at a first pivot element on the first side surface and a second pivot element on the second side surface, the carabiner-type latch extending downward from the bottom surface of the housing, the carabiner-type latch comprising:
      a hook portion; and
      a spring-biased latch portion.

17. The wireless communication device of claim 16, wherein the carabiner-type latch extends downward from the bottom surface of the housing when the carabiner-type latch is in an extended position, and the carabiner-type latch pivots to fold up against the back surface of the housing when the carabiner-type latch is in a closed position.

18. The wireless communication device of claim 17, wherein the back surface of the housing further comprises a battery unit.

19. The wireless communication device of claim 18, wherein the battery unit comprises a recess for accepting the carabiner-type latch when the carabiner-type latch is in the closed position.

20. The wireless communication device of claim 17, wherein the housing further comprises a stop mechanism to maintain the carabiner-type latch in an intermediate position between the extended position and the closed position, wherein the carabiner-type latch is placeable on a substantially horizontal surface to hold the housing in an upright position on the substantially horizontal surface.

* * * * *